No. 811,086. PATENTED JAN. 30, 1906.
G. PRATTS.
CANDY MAKING MACHINE.
APPLICATION FILED MAR. 14, 1905.

2 SHEETS—SHEET 1.

Witnesses
Howard D. Orr.
B. G. Foster.

Inventor,
Gust Pratts,
By E. G. Siggers
Attorney

No. 811,086. PATENTED JAN. 30, 1906.
G. PRATTS.
CANDY MAKING MACHINE.
APPLICATION FILED MAR. 14, 1905.
2 SHEETS—SHEET 2.
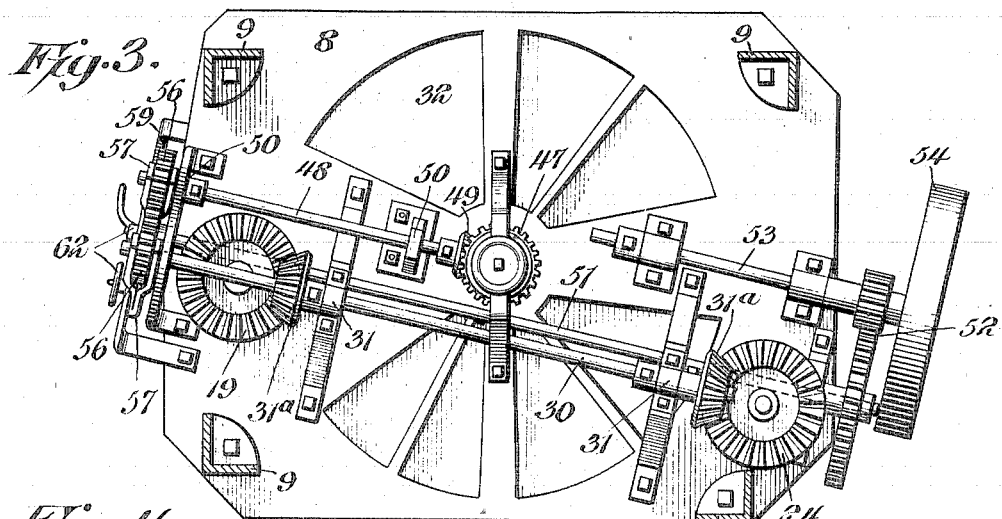
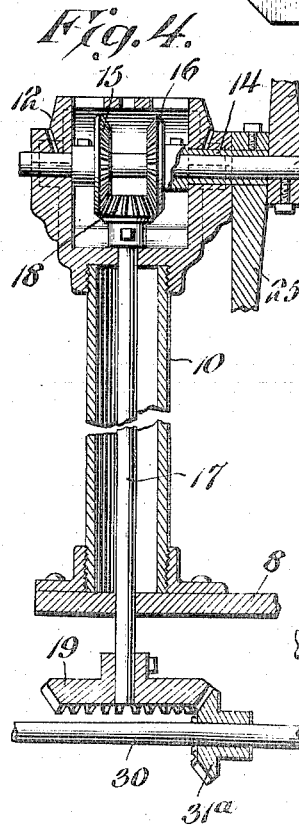
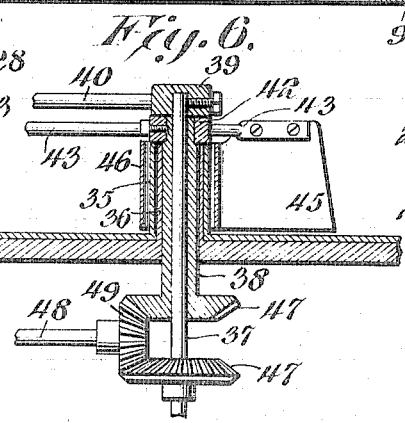
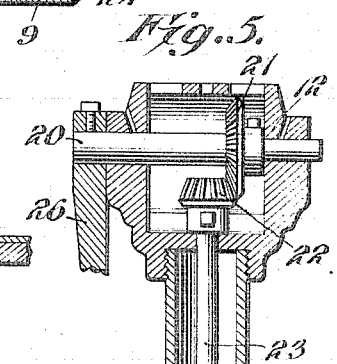
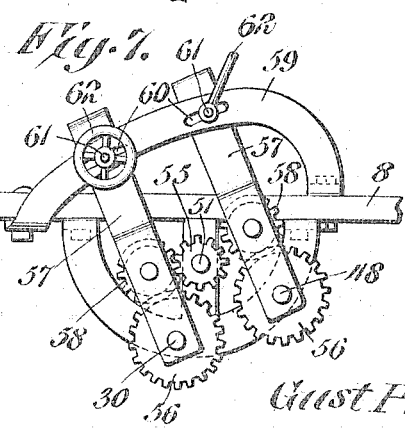
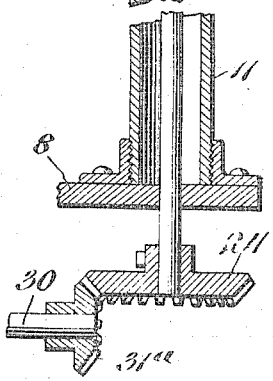
Witnesses
Howard D. Orr
J. H. Foster
Gust Pratts, Inventor,
By C. G. Siggers,
Attorney

UNITED STATES PATENT OFFICE.

GUST PRATTS, OF FLINT, MICHIGAN.

CANDY-MAKING MACHINE.

No. 811,086.     Specification of Letters Patent.     Patented Jan. 30, 1906.

Application filed March 14, 1905. Serial No. 250,058.

*To all whom it may concern:*

Be it known that I, GUST PRATTS, a subject of the King of Greece, residing at Flint, in the county of Genesee and State of Michigan, have invented a new and useful Candy-Making Machine, of which the following is a specification.

The present invention relates to a combination-machine for mixing and pulling candy. One of the principal objects is to provide a novel and comparatively simple machine whereby ingredients may be thoroughly mixed and at the same time candy can be efficiently pulled, the mechanism being compact and conveniently associated, and, furthermore, being so arranged that either the mixing or the pulling means may be operated separately.

A further and important object is to provide a novel arrangement and construction of pulling mechanism that may be employed independently of the mixing means, said mechanism operating upon the candy in a very efficient manner and bringing it to the desired finished condition or state with comparatively great rapidity.

The preferred embodiment of the invention is illustrated in the accompanying drawings and is described in the following specification.

An inspection of the claims hereto appended will clearly indicate that the said invention is not limited to the exact disposition of parts and construction shown.

Figure 1:
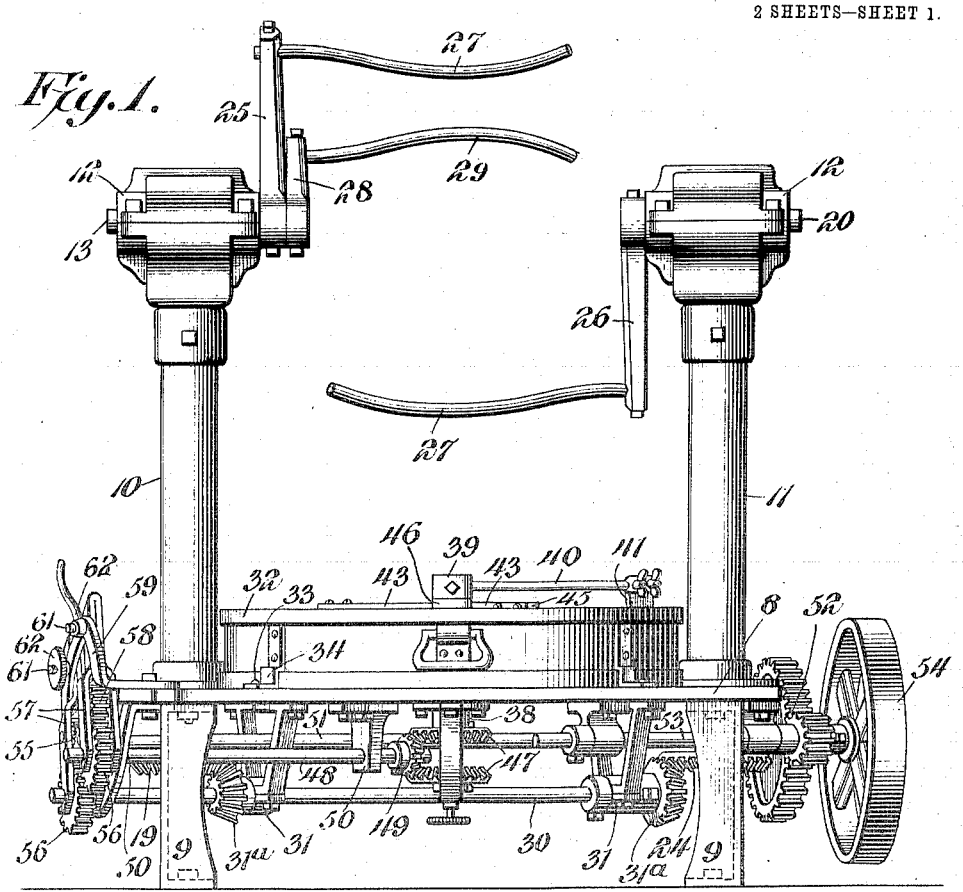
Figure 2:
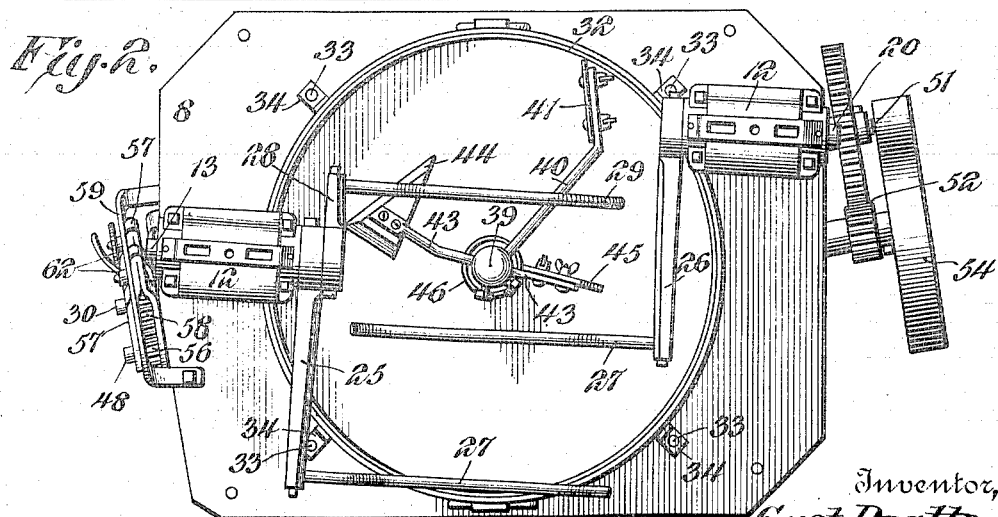

In the drawings, Figure 1 is a side elevation of the machine. Fig. 2 is a top plan view thereof. Fig. 3 is a bottom plan view, the legs being shown in section. Fig. 4 is a detail sectional view through one of the standards. Fig. 5 is a similar view through the other standard. Fig. 6 is a detail sectional view through a portion of the mixing mechanism. Fig. 7 is a view in elevation of the gearing controlling the movements of the mechanisms.

Similar reference-numerals designate corresponding parts in all the figures of the drawings.

In the embodiment illustrated a base in the form of a platform 8 is employed, preferably supported on legs 9 and having mounted on opposite side portions thereof spaced standards 10 and 11. Journal-boxes 12 are secured to the upper ends of the standards, and in the box 12, that is carried by the standard 10, are journaled concentrically-disposed shafts 13 and 14, the shaft 14 being in the form of a sleeve located on the shaft 13. These two shafts thus have their axes of rotation coincident. The shaft 13 constitutes a support for the shaft 14 and extends completely across the box, having secured to its outer portion and within the box a bevel gear-wheel 15. The shaft 14 projects into the box and carries therein a bevel gear-wheel 16, disposed in opposing relation to and spaced from the wheel 15. The standards are tubular, as shown in Figs. 4 and 5, and in the standard 10 is journaled an upright shaft 17, having a bevel-gear 18 at its upper end, that meshes with the gears 15 and 16, the box 12 thus constituting a casing for these gears. The lower end of the shaft 17 projects beneath the platform 8 and has secured thereto a bevel-gear 19. The other standard 11 has journaled in its box 12 a short shaft 20, which shaft is provided with a bevel-gear 21, located within the box and in mesh with another gear 22, carried by the upper end of an upright shaft 23, extending longitudinally through the standard 11, projecting below the platform 8 and having a bevel-gear 24 at its lower end.

Secured to the shafts 14 and 20 are crank-arms 25 and 26, carrying at their free ends pulling-hooks 27, that have intersecting paths of movement, the arms 25 and 26 being preferably of substantially the same length. Another arm 28 is carried by the inner end of the shaft 13 and has a pulling-hook 29. The arms 25 and 28 rotate in opposite directions. The arms 25 and 26 rotate in opposite directions, and the hook 27 of the arm 26 intersects the paths of movement of the other hook 27 and the hook 29. In order to effect the simultaneous rotation of the arms, a counter-shaft 30 is employed, journaled in boxes 31, secured to the under side of the platform 8 and having oppositely-disposed bevel-gears 31ᵃ, that mesh with the gears 19 and 24.

The above constitutes, in effect, the pulling mechanism. The mixing mechanism is as follows: A circular pan or reservoir 32 is mounted on the platform 8 between the standards 10 and 11, being suitably secured thereto by fastening-bolts 33, passing through ears 34, carried by said pan or reservoir. This pan or reservoir has a central upstanding collar 35, that snugly receives a smaller projection or boss 36, forming a part of the base. The projection or boss constitutes a journal-box for concentric shafts 37 and 38, extending therethrough, the shaft 38 having a bore to receive the shaft 37 and said shaft 37 extending above and below the shaft 38. Secured to the upper end of the shaft 37 is a cap 39, from which projects an arm 40, carrying at its outer end a stirrer or scraper-blade 41, located at an inclination to the arm 40 and having its outer edge disposed contiguous to the side wall of the pan or reservoir. To the upper end of the shaft 38 is secured a collar 42, carrying oppositely-extending arms 43, one of the arms being provided at its free end with a plow or wedge-shaped stirrer 44, the other carrying a scraper-blade 45, disposed contiguous to the shafts and being provided with a guard-sleeve 46, that surrounds the upstanding collar 35 of the pan.

No claim is made in this application to the above-described specific structure of the mixing mechanism, except in so far as the same is interrelated with the driving means therefor and with the pulling mechanism.

The lower ends of the shafts 37 and 38 have oppositely-disposed bevel gear-wheels 47, and a counter-shaft 48 is provided with a bevel-gear 49, meshing with both of the gears 47, and thus driving the same in opposite directions. The shaft 48 is journaled in boxes 50, secured to the under side of the platform, and is disposed longitudinally alongside the counter-shaft 30, both of these counter-shafts projecting beyond one edge of the platform.

A driving-shaft 51 is journaled beneath the platform 8 and is geared at one end, as shown at 52, to a power-shaft 53, also journaled upon the under side of the platform, and having a pulley 54, by means of which power may be applied thereto, said pulley being disposed at one end of the machine. At the other end of the machine the driving-shaft 51 is provided with a pinion-gear 55, and the counter-shafts 30 and 48 are provided with gears 56. Carrier-yokes 57 are respectively journaled upon the shafts 30 and 48 and are provided with idler-gears 58, that are respectively in mesh with the gears 56. Moreover, these gears 58 are movable into and out of mesh with the pinion 55 when the carrier-yokes are swung, as will be apparent by reference to Fig. 7. In order to maintain the gears in and out of mesh, means are provided for holding the carriers against movement, such means comprising a bracket 59, secured to the adjacent end of the platform 8 and having slots 60 therethrough. Clamping-bolts 61, mounted on the carriers, project through the slots, and threaded thereon are clamping-nuts 62, adapted to engage the bracket 59.

It is believed that the operation of the machine can now be readily understood. When candy is both to be mixed and pulled, the idler-gears 58 are placed in mesh with the pinion 55 of the driving-shaft, and consequently when said driving-shaft is rotated the counter-shafts will also be revolved. As a result the mixers in the pan or reservoir will be operated, the outer stirring-blade urging the material inwardly into the path of movement of the plow and said plow returning it outwardly. In like manner the inner blade will agitate the material disposed inside the path of movement of the plow and effect an outward movement of such material. The candy to be pulled is placed upon the hooks 27 and 29, and the single hook 27, revolving through the paths of movement of the other hook 27 and the hook 29, will thoroughly pull the taffy. Moreover, as the hook 29 revolves in an opposite direction from the hook 27, journaled on the same standard, this pulling action is made much more effective. In case it is desired to use either mechanism without the other, it is of course only necessary to disengage the proper idler from the pinion of the drive-shaft, whereupon the other mechanism, still being in gear, will be driven. Furthermore, the pulling mechanism is capable of advantageous use without the mixing means, as will be apparent.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a candy-making machine, the combination with a base, of mixing mechanism mounted thereon, pulling mechanism also mounted on the base, and driving means for said mechanism also mounted on the base.

2. In a candy-making machine, the combination with a base, of mixing mechanism mounted thereon, pulling mechanism also mounted on the base and located over the mixing mechanism, and driving means for said mechanisms mounted beneath the base.

3. In a candy-making machine, the combination with supporting means including a base and standards, of mixing mechanism mounted on the base, pulling mechanism mounted on the standards, a driving device, and gearing mounted on the supporting means and detachably connecting the device and said mechanisms.

4. In a candy-making machine, the combination with supporting means including a base, legs and standards, of mixing mechanism mounted on the base, pulling mechanism mounted on the standards, a driving device mounted beneath the base, and separate sets of gearing detachably connecting the driving device and said mechanism.

5. In a candy-making machine, the combination with supporting means including a base having depending legs and upstanding standards, of mixing mechanism mounted on the base, pulling mechanism mounted on the standards, a drive-shaft having a gear, separate gearing connected to the mixing mechanism and the pulling mechanism and including idlers in mesh with the gear, and swinging supports journaled on the supporting means and carrying the idlers, said supports moving said idlers into and out of engagement with the gear on the shaft.

6. In a candy-making machine, the combination with a base, of mixing and pulling mechanisms mounted thereon, a driving-shaft having a gear, counter-shafts respectively connected to the mixing and pulling mechanisms and having gears disposed contiguous to the gear on the driving-shaft, swinging supports, idlers carried by said supports, said idlers meshing with the gear on the driving-shaft and the gears on the counter-shafts, and means for holding the supports in different relations.

7. In a candy-making machine, the combination with a base, of rotatable mixing mechanism centrally mounted thereon, gearing for the same extending centrally beneath the base and including bevel gear-wheels, rotatable pulling mechanism mounted on the base above the mixing mechanism, gearing for the same including bevel-gears located beneath opposite side portions of the base, a drive-shaft extending beneath the base, power mechanism connected to one end of the drive-shaft, counter-shafts respectively geared to the bevel-gears of the mixing mechanism and the bevel-gears of the pulling mechanism, a gear-wheel mounted on one end of the drive-shaft, gears secured to the adjacent ends of the counter-shafts, swinging supports journaled on said counter-shafts, idlers carried thereby and meshing with the counter-shaft gears, said idlers being movable into and out of the gear of the drive-shaft when the supports are swung, and means for securing the supports against movement.

8. In a candy-making machine, the combination with a base having an upright support, of separate pulling-arms of different lengths journaled on the support and having substantially horizontal and coincident journal-axes, outstanding candy engaging and supporting elements carried by the arms and having upright paths of movement, a drive-shaft journaled beneath the base, and connections between the drive-shaft and arms for rotating the arms simultaneously in opposite directions, said connections being associated with the support.

9. In a candy-making machine, the combination with a base having an upstanding support, of concentric substantially horizontal shafts journaled on the upper portion of the support, pulling-arms carried by the shafts and provided with outstanding candy-supporting elements having upright paths of movement, and means for operating the shafts, said means including a substantially horizontal driving-shaft journaled on the base and having gear connections with the concentric shafts.

10. In a candy-making machine, the combination with a base, of a tubular standard mounted thereon, concentric shafts journaled on the standard, pulling-arms of different lengths carried by the shafts and having candy-engaging means, an upright shaft journaled in the standard, and gearing connecting the shaft and the shafts carrying the arms.

11. In a candy-making machine, the combination with a base, of spaced upright tubular standards secured thereto, shafts journaled in the standards, coacting arms carried by the shafts, upright shafts journaled in the standards, gearing connecting the upright and arm carrying shafts, and means located beneath the base for rotating the upright shafts.

12. In a candy-making machine, the combination with spaced supports, of oppositely-rotatable shafts on one of the supports, pulling-arms carried by the shafts and being thus rotatable in opposite directions, said arms having candy-engaging portions, and another pulling-arm journaled on the other support and having its axis of rotation substantially parallel to the axes of rotation of the first-mentioned arms, said last-mentioned arm being provided with a candy-engaging portion having a path of movement intersecting the paths of movement of the candy-engaging portions of said first-mentioned rotatable arms.

13. In a candy-making machine, the combination with spaced standards, of concentric shafts journaled on one standard, pulling-arms of different lengths carried by the shafts, another shaft journaled on the other standard, a pulling-arm carried by the latter shaft and coacting with the arms of the first-mentioned shafts, means for rotating the concentric shafts in different directions and also for rotating the single shaft.

14. In a candy-making machine, the combination with a base, of spaced standards mounted thereon, journal-boxes carried by the upper ends of the standards, concentric shafts journaled in one of the boxes, an upright shaft located in the standard and geared to the concentric shafts for driving the same in opposite direction, a shaft journaled in the box of the other standard, an upright shaft journaled in said standard and geared to the shaft for rotating the same, pulling-arms carried by the shafts in the boxes and having intersecting paths of movement, and gearing located beneath the base for driving the upright shafts.

15. In a candy-making machine, the combination with spaced supports, of concentric shafts journaled on one of the supports, pulling-arms carried by the shafts and having different paths of movement, another pulling-arm journaled on the other support and having a path of movement that intersects the paths of movement of the first-mentioned arms, and means for rotating the shafts and last-mentioned arm.

In testimony that I claim the foregoing as my own I have hereto affixed my signature in the presence of two witnesses.

GUST PRATTS.

Witnesses:
 JOHN F. BAKER,
 ALICE M. GALBRAITH.